United States Patent
Delamarche (10) Patent No.: US 8,020,586 B2
(45) Date of Patent: Sep. 20, 2011

(54) ONE-STEP FLOW CONTROL FOR CROSSING CHANNELS

(75) Inventor: Emmanuel Delamarche, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 467 days.

(21) Appl. No.: 12/329,550

(22) Filed: Dec. 6, 2008

(65) Prior Publication Data

US 2010/0140517 A1    Jun. 10, 2010

(51) Int. Cl.
*F15C 1/04* (2006.01)
(52) U.S. Cl. ............ 137/831; 251/65; 251/129.03; 251/129.14
(58) Field of Classification Search ......... 137/614.11, 137/825, 829, 831; 251/65, 129.03, 129.14
See application file for complete search history.

(56) References Cited

U.S. PATENT DOCUMENTS

| | | | |
|---|---|---|---|
| 5,052,429 A * | 10/1991 | Yoo .................... | 137/38 |
| 6,398,183 B1 * | 6/2002 | Kerger et al. ........ | 251/65 |
| 6,606,922 B2 | 8/2003 | Case et al. | |
| 6,802,489 B2 | 10/2004 | Marr et al. | |
| 6,981,518 B2 | 1/2006 | Gilbert et al. | |
| 7,033,148 B2 | 4/2006 | Bunner et al. | |
| 7,338,028 B2 * | 3/2008 | Zimmerling et al. ... | 251/7 |
| 2004/0265150 A1 | 12/2004 | McElfresh et al. | |
| 2005/0116798 A1 | 6/2005 | Bintoro et al. | |
| 2010/0139797 A1 * | 6/2010 | Delamarche ......... | 137/806 |
| 2010/0143193 A1 * | 6/2010 | Delamarche ......... | 422/68.1 |

* cited by examiner

*Primary Examiner* — Craig M Schneider
(74) *Attorney, Agent, or Firm* — Stephen C. Kaufman (57) ABSTRACT

In one embodiment of the present invention, an apparatus for one-step flow control at a micro-channel crossing comprises a first micro-channel and a second micro-channel, a plurality of magnetic valves, and a guiding magnet. The guiding magnet produces a proximal magnetic field gradient at a location of each of the plurality of magnetic valves when an operator places the guiding magnet in a vicinity of the chip. The vicinity of the chip comprises a plurality of guiding magnet position ranges. The operator repositions guiding magnet in order to actuate the plurality of magnetic valves simultaneously. Depending on the position of the guiding magnet, the passages are blocked or unblocked to stop or let the fluid flow in a given crossing.

1 Claim, 10 Drawing Sheets

ONE-STEP FLOW CONTROL FOR CROSSING CHANNELS

This application is related to two other co-pending applications (but different inventions), with same assignee and common inventor(s), titled "Magnetic valves for performing multi-dimensional assays" and "Magnetically actuated microfluidic mixers".

BACKGROUND OF THE INVENTION

Over the past several decades, numerous efficient technologies have been developed to control or measure the flow of fluids. Designs of numerous flow control devices and valves are indebted to the development and advancement of oil, gas, and petrochemical industries in the past century. Design of many aerospace, chemical and mechanical systems have been dependent on assessment of amount of fluid passed a certain point in the process or in the equipment.

However, the available methods or equipment are most efficient in the conventional ranges used in the established industry. In microfluidic devices as used in emerging technologies, the features and passages of flow are extremely tiny in micron's range, and extra forces come to play and appear in the governing laws of fluid flow in the liquid or gas. These differences have created the necessity of new designs for specialized flow control.

For example, since recently, the procedure of assay to measure a property or concentration of an analyte is performed by efficient electro-mechanical microfluidic devices. Numerous types of assays include antigen capture assay, bioassay, competitive protein binding assay, crude oil assay, four-point assay, immunoassay, microbiological assay, stem cell assay, and numerous types of concentration assays.

There are several occasions in the process of an assay, for example, in which the flow of the liquid needs to be controlled by a valve. This situation is present in much other state-of-the-art equipment, such as lab-on-a-chip devices. Currently, we do not have a simple and efficient valve with extremely small leakage potential, and operable in the microfluidic systems, especially as used in MEMS and BioMEMS technologies.

In addition, microfluidics having crossing channels can bring various liquids for analysis in one area. However, the liquids must be passed in the right sequence, at the right time and using the right volume of solution. Typically, actuators or valves are used to stop or let a liquid pass in a microchannel. However, actuators are expensive to fabricate and necessitate peripheral equipment. Magnetically actuated valves are simpler to fabricate and actuate than many other types of valves.

The act of magnetic actuation can be done by as simply as applying an external magnetic field. However, because magnetic fields can have a long range effect on valves, external magnetic actuation of valves cannot work on specific magnetic valves that are closely spaced.

SUMMARY OF THE INVENTION

An apparatus for one-step flow control at a micro-channel crossing comprises two microchannels, a series of magnetic valves, and a guiding magnet. The guiding magnet produces a proximal magnetic field gradient at a location of each of the magnetic valves when an operator places the guiding magnet in a vicinity of the chip.

The vicinity of the chip comprises a plurality of guiding magnet position ranges. The operator repositions guiding magnet in order to actuate the magnetic valves simultaneously. If the guiding magnet is within an ON-ON position range, then both magnetic valves are simultaneously at the ON state. If the guiding magnet is within an ON-OFF position range, then simultaneously the first magnetic valve is at the ON state, and the second magnetic valve is at the OFF state. If the guiding magnet is within an OFF-ON position range, then simultaneously the first magnetic valve is at the OFF state, and the second magnetic valve is at the ON state. Finally if the guiding magnet is within an OFF-OFF position range, then both magnetic valves are simultaneously at the OFF state.

DETAILED DESCRIPTION OF THE PREFERRED EMBODIMENTS

In one embodiment, an apparatus for one-step flow control at a micro-channel crossing is presented as an example of this invention. The apparatus comprises of two micro-channels. The first micro-channel and the second micro-channel cross each other at the micro-channel crossing on a microfluidic chip.

The apparatus further comprises a series of magnetic valves and a guiding magnet. The guiding magnet produces a proximal magnetic field gradient at a location of each of the magnetic valves when an operator places the guiding magnet in a vicinity of the chip. A first magnetic valve controls fluid flow in the first micro-channel, and a second magnetic valve controls fluid flow in the second micro-channel.

Each magnetic valve comprises a magnetic bead and a cavity on the chip next to a corresponding micro-channel section. The magnetic bead comprises a magnetic volume element; wherein the magnetic volume element forces the magnetic bead to move along a cavity length of the cavity in response to the proximal magnetic field gradient, and a bead surface cover; wherein the bead surface cover provides chemical resistance and reduces friction and stiction of the magnetic bead within the cavity.

The cavity length is perpendicular to the corresponding micro-channel section, and has a closed end away from the corresponding micro-channel section and an open end at the corresponding micro-channel section. Each magnetic valve is at an ON state, if the magnetic bead is at the closed end of the cavity length allowing fluid flow through the corresponding micro-channel section. Each of the magnetic valves is at an OFF state, if the magnetic bead is at the open end of the cavity length blocking fluid flow through the corresponding micro-channel section.

The vicinity of the chip comprises a plurality of guiding magnet position ranges. The operator repositions guiding magnet within the plurality of guiding magnet position ranges in order to actuate the plurality of magnetic valves simultaneously. If the guiding magnet is within an ON-ON position range of the guiding magnet position ranges, then both the first magnetic valve and the second magnetic valve are simultaneously at the ON state.

If the guiding magnet is within an ON-OFF position range, then simultaneously the first magnetic valve is at the ON state, and the second magnetic valve is at the OFF state. If the guiding magnet is within an OFF-ON position range, then simultaneously the first magnetic valve is at the OFF state, and the second magnetic valve is at the ON state. Finally, if the guiding magnet is within an OFF-OFF position range, then both the first magnetic valve and the second magnetic valve are simultaneously at the OFF state.

Figure 1:
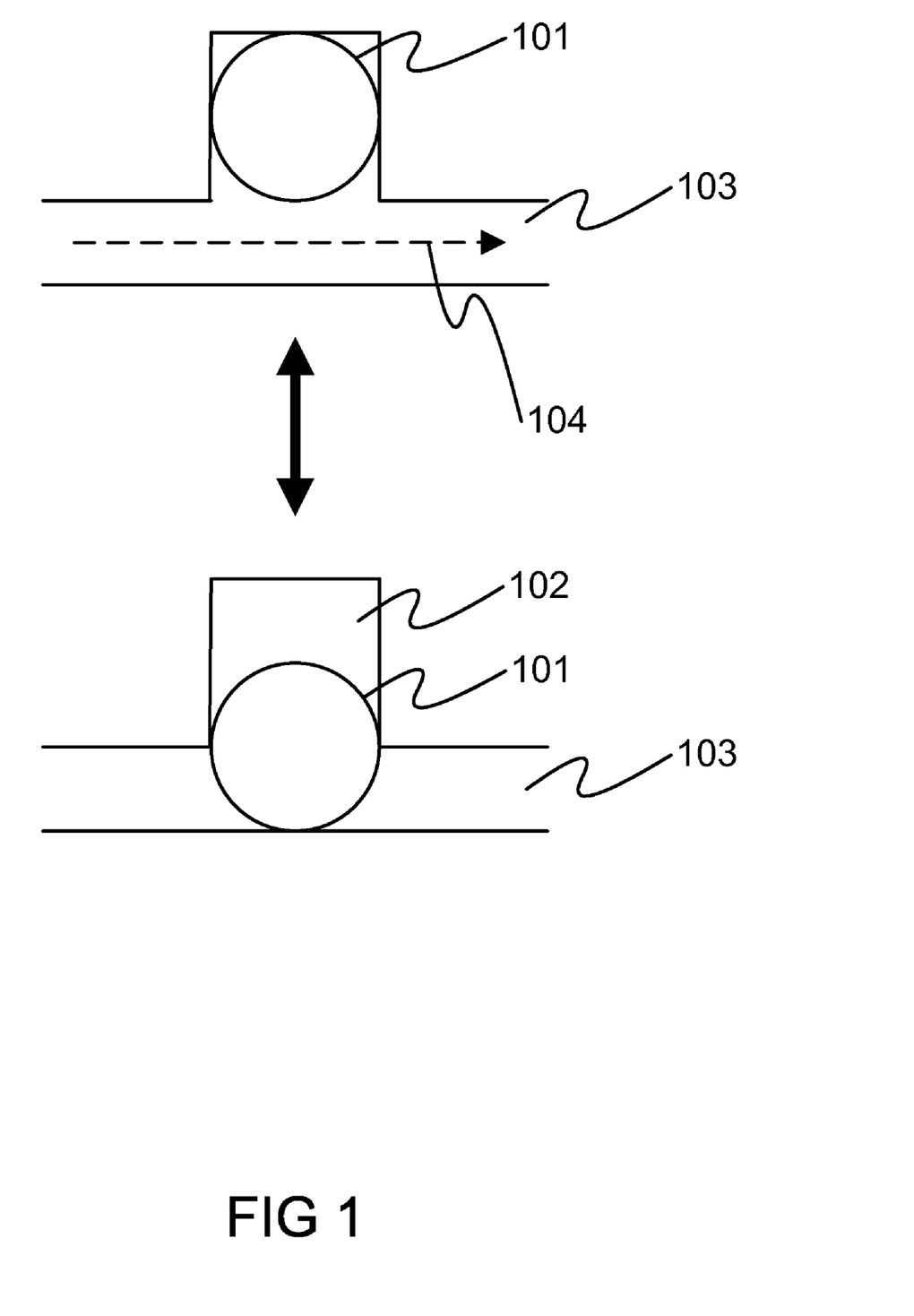
FIG. 1 illustrates schematically the mechanism of closing the microchannel using a bead.
Figure 2:
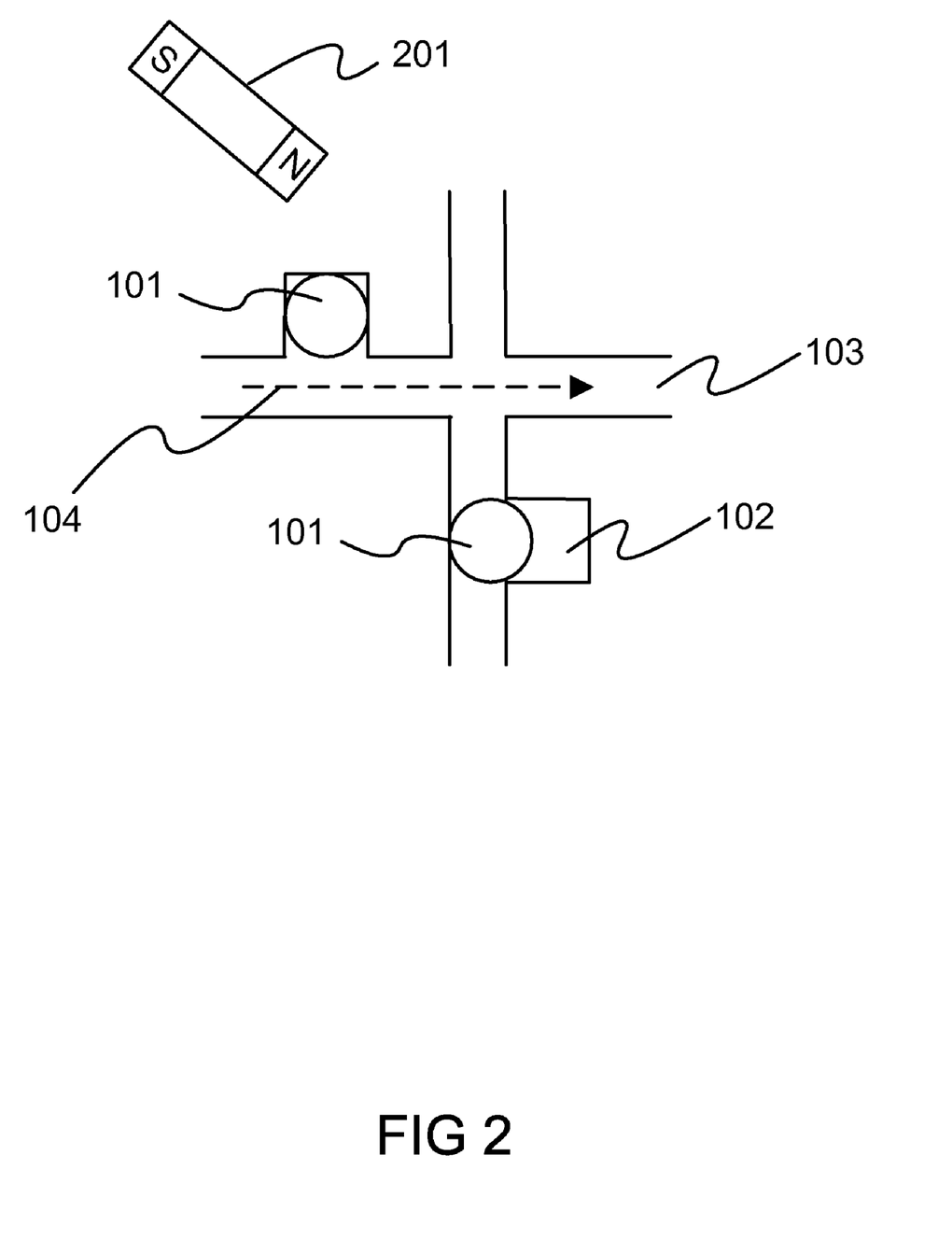
FIG. 2 illustrates schematically an application of the present invention at a crossing of two microchannels when the magnet is used to allow a horizontal flow.
Figure 3:
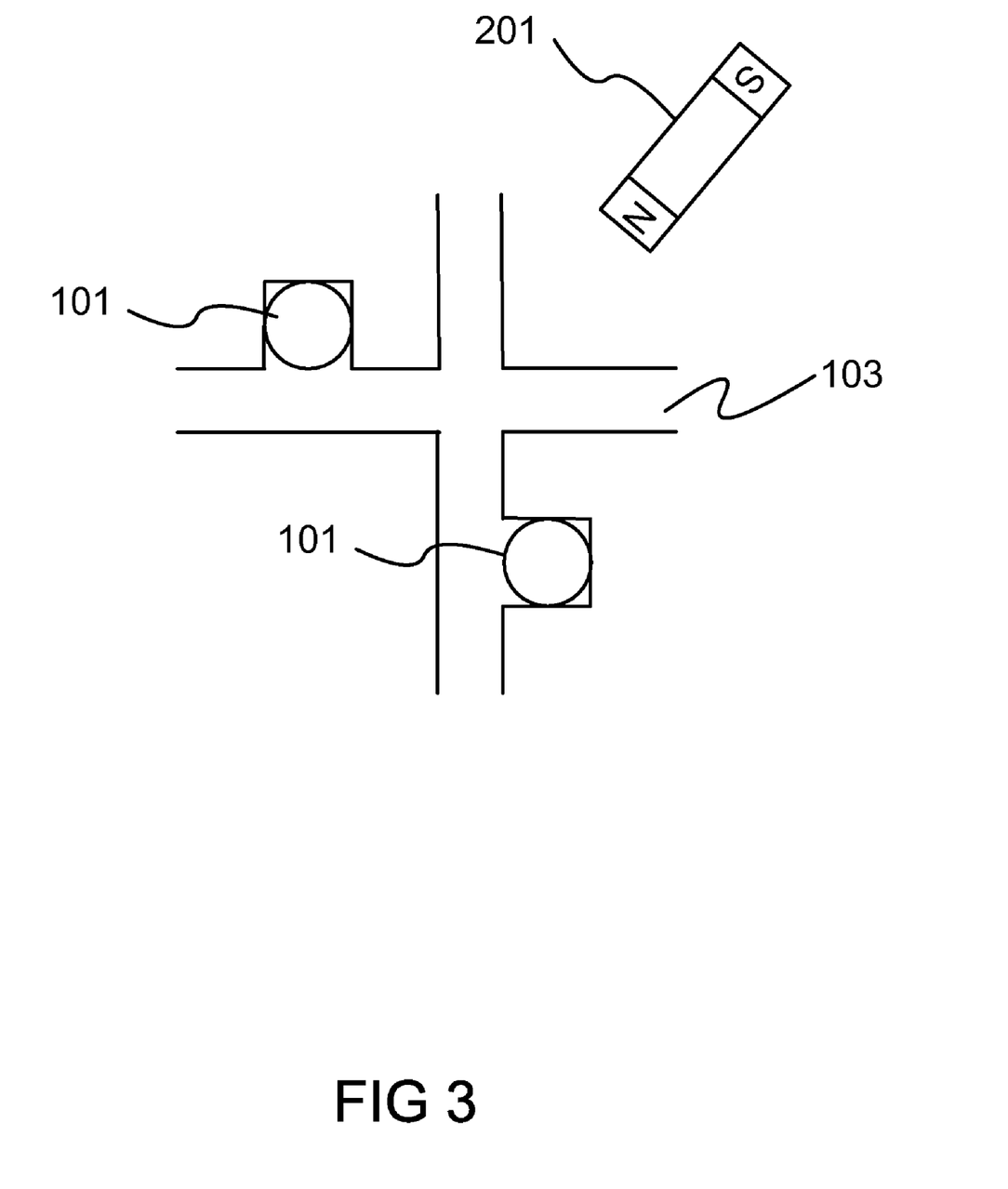
FIG. 3 illustrates schematically an application of the present invention at a crossing of two microchannels when the magnet is used to open all the passages.
Figure 4:
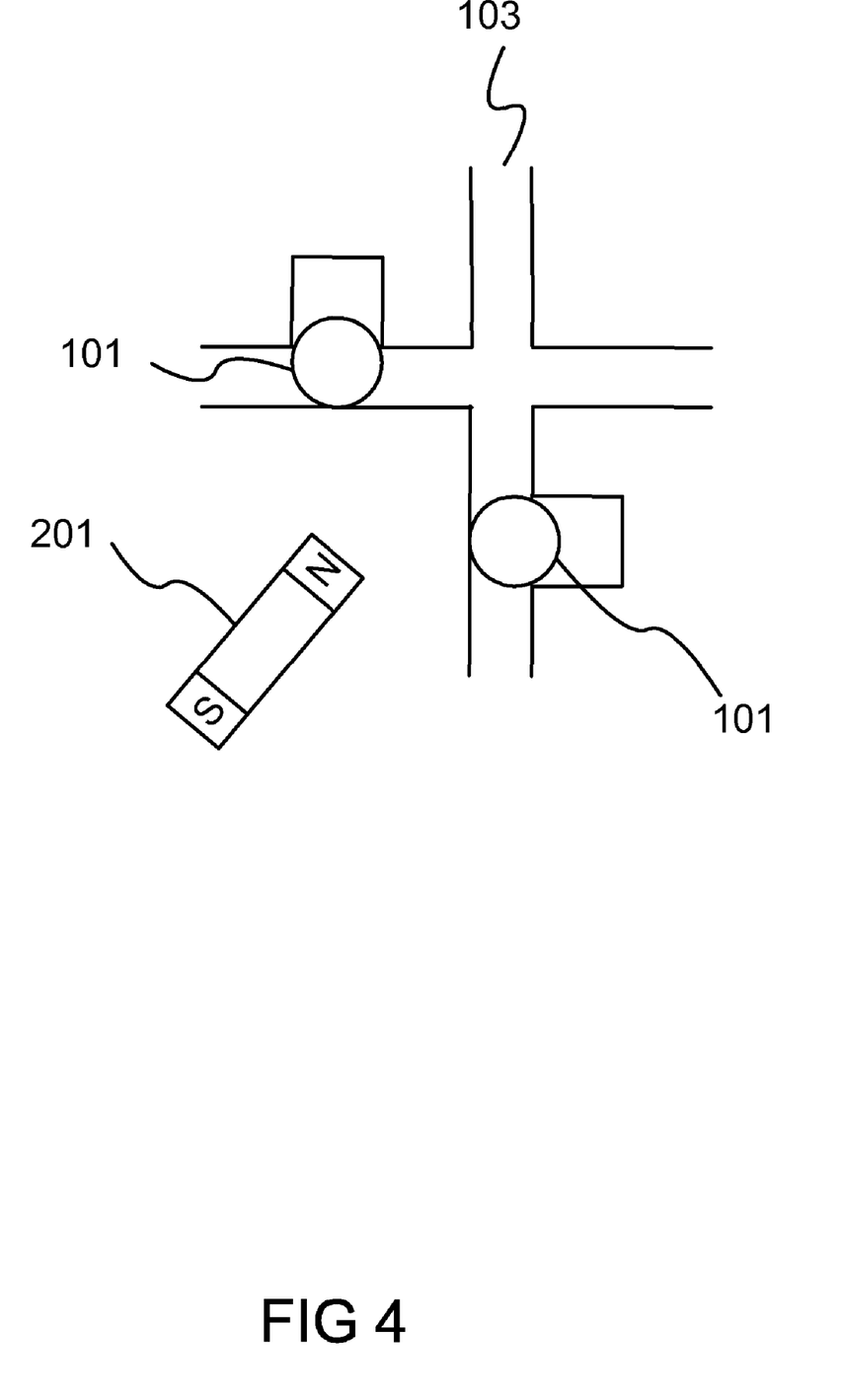
FIG. 4 illustrates schematically an application of the present invention at a crossing of two microchannels when the magnet is used to close all the passages.
Figure 5:
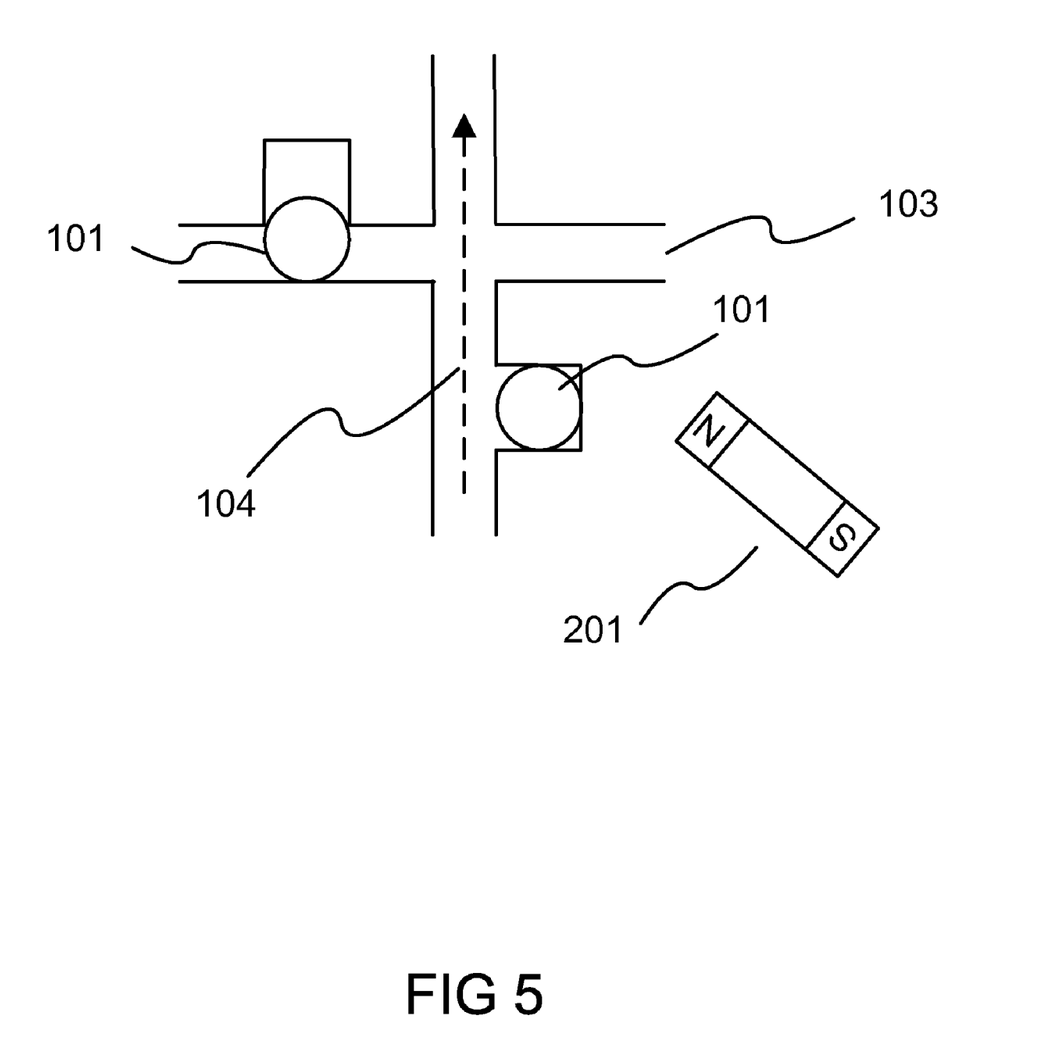
FIG. 5 illustrates schematically an application of the present invention at a crossing of two microchannels when the magnet is used to allow a vertical flow.

In one embodiment of the present invention, as shown in FIG. 1, a particle (101) having a magnetic volume element is moved in a proximal magnetic field gradient, from open (FIG. 1 top) position to close (FIG. 1 bottom) position. When in open position, the bead (101) allows for fluid flow (104) in the microchannel (103) and when it is in close position, it forms a cavity (102) and blocks the flow of liquid thus functioning as a valve. In the current example, magnetic valves as represented by Items 605 and 606 in FIGS. 6 and 7, comprise of one or more bead (101), one or more cavities (102), and one or more microchannel (103).

The particle can be, for example, a polystyrene bead containing an iron-oxide core with an overall diameter of 1-20 micrometer with an organic shell. Density, size, color, fluorescence, surface charges and/or chemistry of the particle (101) can be well defined. As an example, the bead can be covered by perfluorinated layer (2-5 nm thick) to minimize friction and stiction and provide chemical resistance.

In one embodiment, external magnetic element (201) can be from a rare earth alloy and beads can have dyes to allow direct visual control of the state of the valve. Beads can be placed with high control in cavities using "Self-Assembly, Transfer and Integration (SATI)". In other embodiments, as shown in FIGS. 2-5, the external magnetic element (201) is placed in alternative locations and directions to guide the flow into the desired channel by opening or closing the two valves.

In this embodiment, multiple beads or coated particles can be used in one valve, helping to relax positioning and fabrication issues, and improving efficiency of closed state. In addition, using multiple beads provides the possibility of having multi-state valves which are capable to open or close multiple passages simultaneously. In other embodiments, several valves can be placed in series to improve sealing efficiency. An assembly of magnetic valves with certain purpose can be regarded as a single magnetic valve. Furthermore, embodiments of this invention can be applied to create autonomous capillary systems with flow control.

In another embodiment, as shown in FIGS. 2-5, flow control in crossing channels is made possible by applying a magnetic field to attract beads. Magnetic valves fabricated on each of the crossing microchannels are designed so as to be simultaneously actuated when a magnetic field is applied in one direction to allow one step flow control for crossing channels. At a crossing, depending on the location of the magnet (201), one valve opens and the other closes or any other combinations occurs. Manual actuation by hand is possible and does not require precise positioning of the magnet. This geometry helps increasing the areal density of crossing zones. In this example application as shown in FIGS. 2-5, the magnet can be located in four different regions for acquiring four different results: ON-ON, ON-OFF, OFF-ON, and OFF-OFF.

Figure 6:
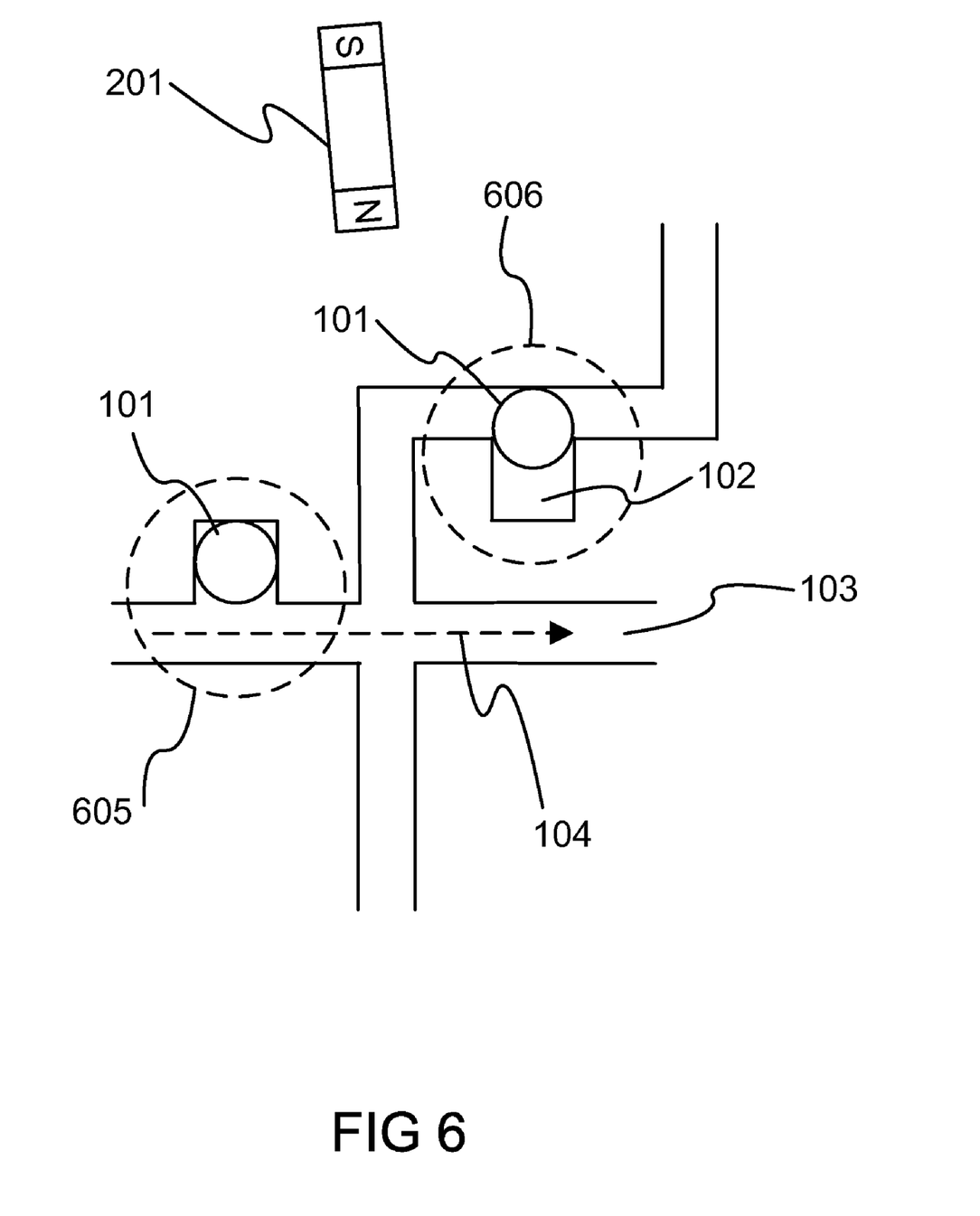
FIG. 6 illustrates schematically another application of the present invention at a crossing of two microchannels to allow a horizontal flow.
Figure 7:
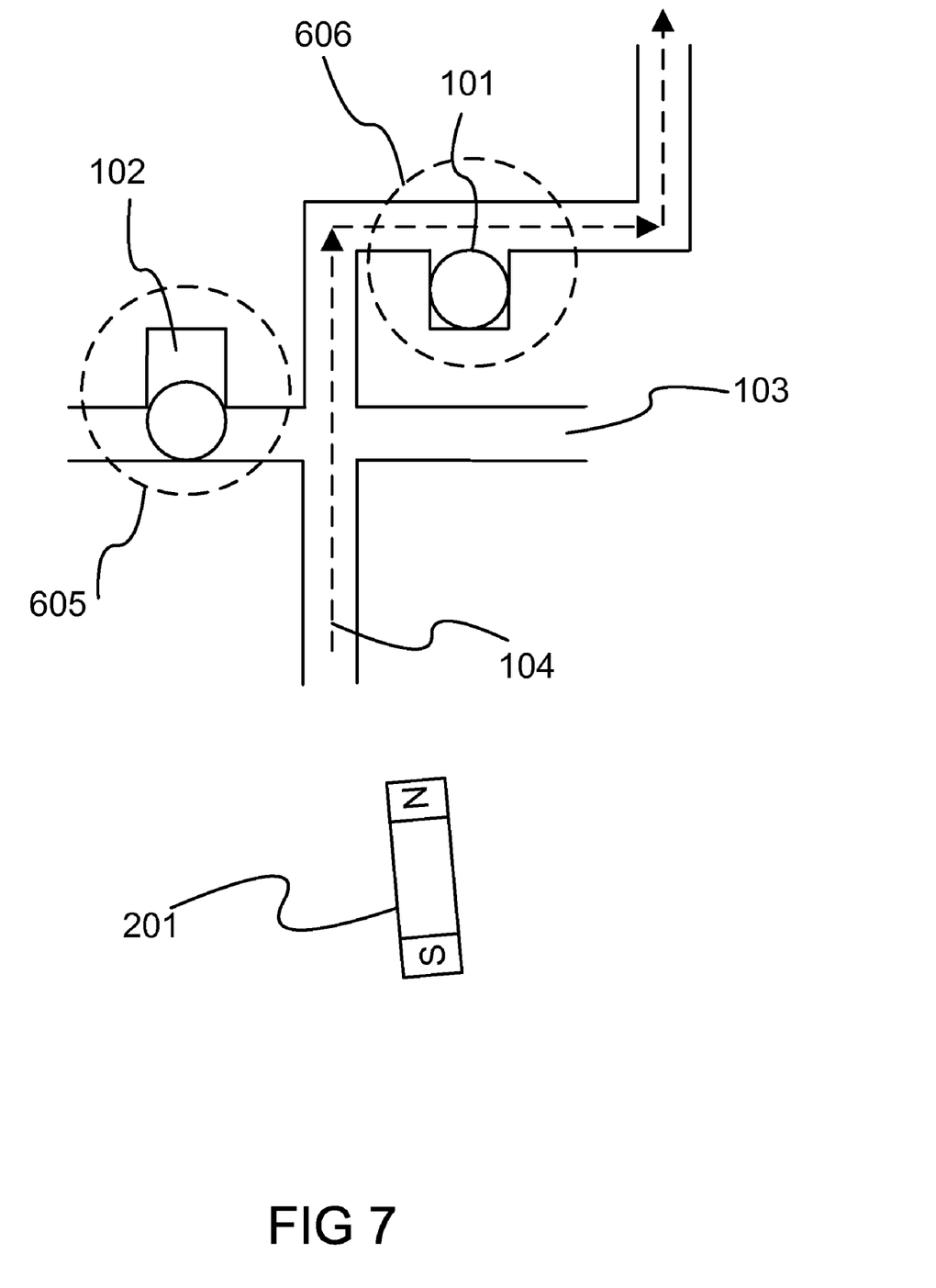
FIG. 7 illustrates schematically another application of the present invention at a crossing of two microchannels to allow a vertical flow.
Figure 8:
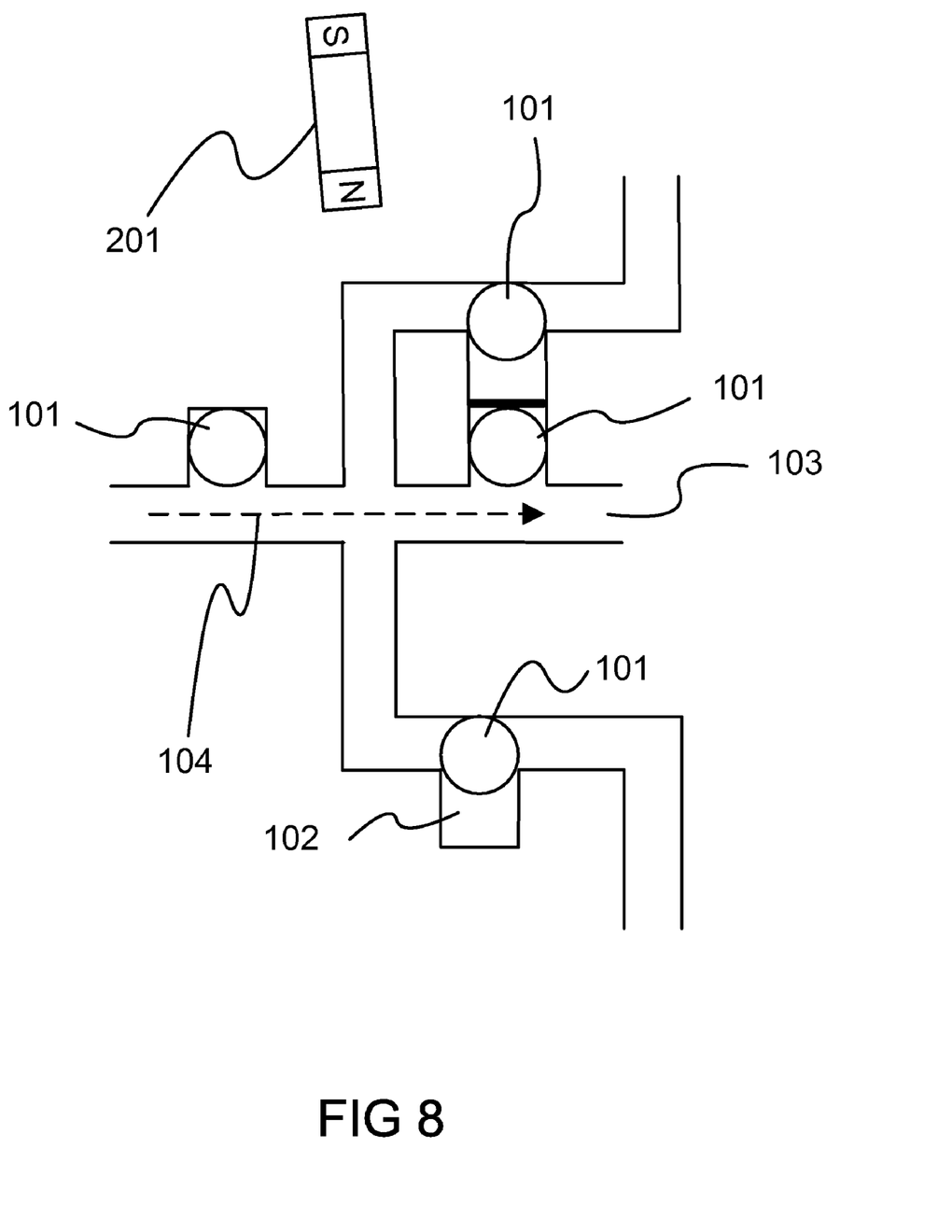
FIG. 8 illustrates schematically another configuration of the present invention at a crossing of two microchannels to allow a horizontal flow.
Figure 9:
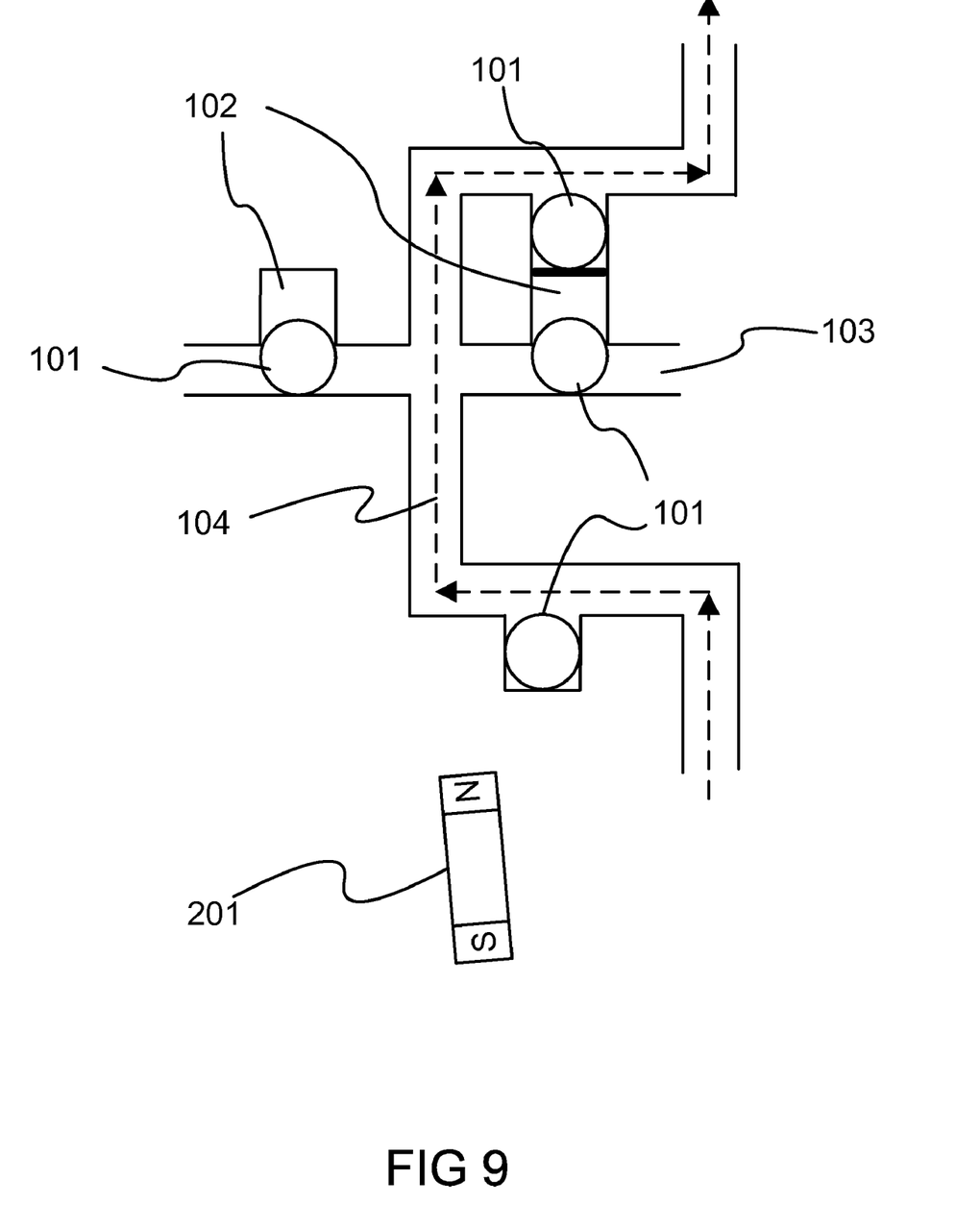
FIG. 9 illustrates schematically another configuration of the present invention at a crossing of two microchannels to allow a vertical flow.

In another embodiment, as shown in FIGS. 6 and 7, different configuration of the two magnetic valves has helped reduce the restriction on the location of the magnet to arrive at similar results. In these cases, both beads move from one configuration to the other configuration. That is, the beads move up or down at the same time. Another variation of this embodiment is one-step flow control in crossing channels with double valves as shown in FIG. 8 and FIG. 9. Similar to the previous case, by using double valves, the two different cases for the flow can be achieved. One advantage is that the magnet can be placed in a less restrictive way and still correct actuations are performed. Other configurations are also possible.

Figure 10:
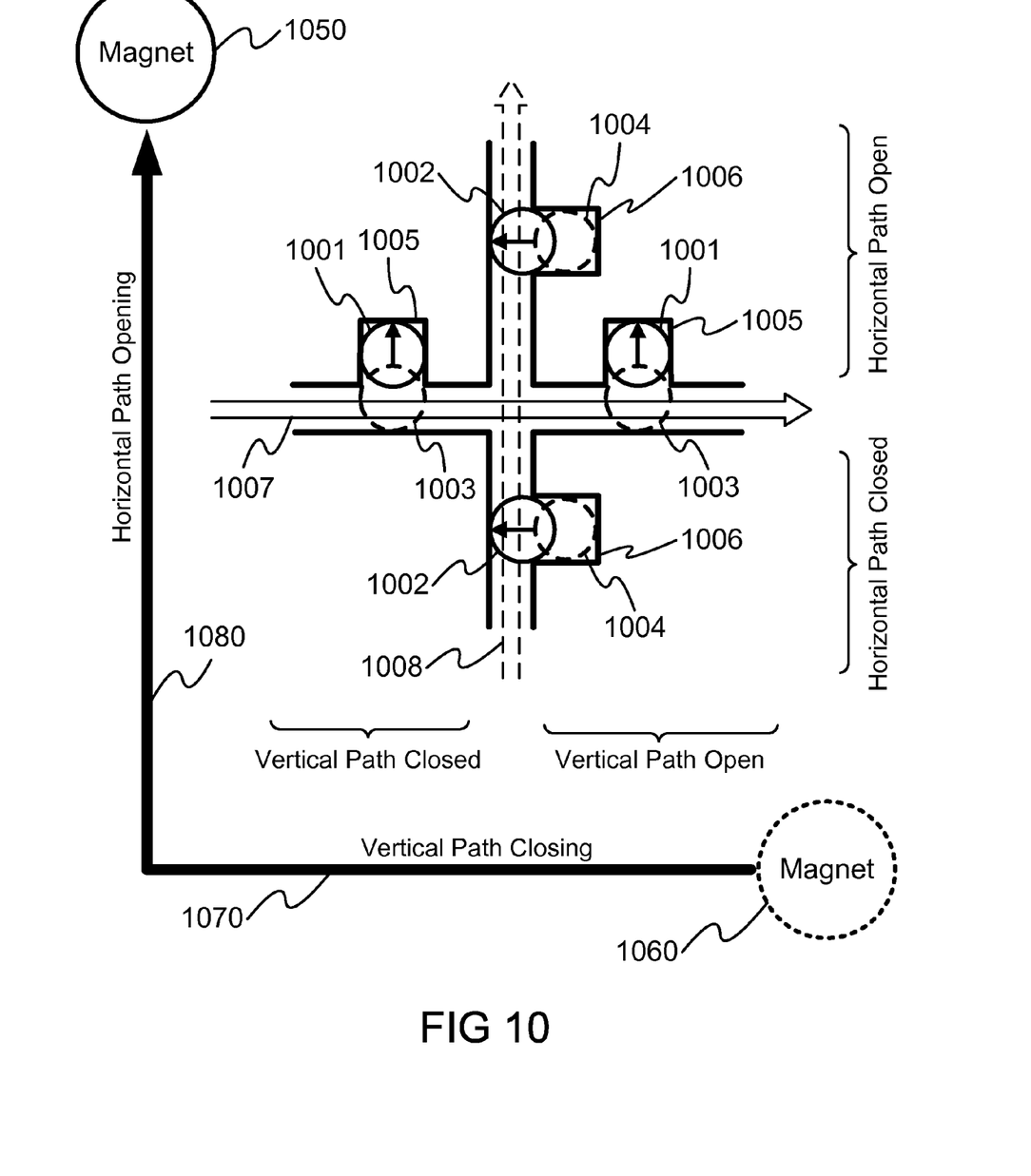
FIG. 10 illustrates schematically another application of the present invention at a crossing of two microchannels to allow none, one, or both vertical flow and horizontal flow.

FIG. 10 shows a configuration of magnetic valves at a cross section of two microchannels. In one embodiment, (one or) two values (1005) on the horizontal channel control the horizontal flow (1007). And (one or) two valves control on vertical channel control the vertical flow (1008). If the magnet is placed on the left side of the channel cross section, the vertical valves close as the magnetic beads (1002) close the vertical channel and prevent the vertical flow. On the other hand, if the magnet is at the right side of the cross section, the vertical valves open as their magnetic beads (1004) move away from the vertical flow. Similarly, when the magnet is at top of the channel cross section (i.e., top of FIG. 10), the horizontal valves open the horizontal flow as their beads (1001) move up. Also, when the magnet is at the bottom of the cross section, the magnetic beads (1003) block the horizontal flow. Therefore, in this configuration, the state of the valves follows the particular quadrant (with respect to the cross section) the magnet is located, i.e., one or both vertical and horizontal channels can be open or closed. In one embodiment, as shown in FIG. 10, when a magnet (e.g., a course magnet or a fine magnetic tip) moves from a location at lower right quadrant (1060) to top left quadrant (1050) on path (1070 & 1080), the vertical channel closes as the magnet moves on its horizontal portion of its path (1070), and the horizontal channel opens as the magnet moves along its vertical portion of its path (1080).

A method, system, or an article/method of manufacture comprising one of the following items is an example of the invention: fluid flow, microfluidic, device, microfabrication, control, crossing channels, microchannels, guiding magnet, proximal magnetic field, chip, magnetic bead, cavity, actuation, magnetic valves, position range, magnetic volume element, coating, bead surface cover, particle, polystyrene bead, Iron oxide core, organic shell, perfluorinated layer coating, magnetic valves with multiple valves or bead/cavity assembly, actuation, arrays, valves, magnets, moving the magnets, opening/closing the valve(s), directing, redirecting, rearranging, calibrating, increasing, decreasing, or stopping the flow (s), at different directions, grouping, regrouping, or any microfluidic device, applying the apparatus mentioned above, for the purpose of the current invention or performing one-step flow control for crossing channels.

Any variations of the above teaching are also intended to be covered by this patent application.

The invention claimed is:

1. An apparatus for one-step flow control at a micro-channel crossing, said apparatus comprising:
   a first micro-channel and a second micro-channel;
   wherein said first micro-channel and said second micro-channel cross each other at said micro-channel crossing on a microfluidic chip;
   a plurality of magnetic valves; and
   a guiding magnet;
   wherein said guiding magnet produces a proximal magnetic field gradient at a location of each of said plurality of magnetic valves when an operator places said guiding magnet in a vicinity of said chip;
   wherein a first magnetic valve of said plurality of magnetic valves controls fluid flow in said first micro-channel, and a second magnetic valve of said plurality of magnetic valves controls fluid flow in said second micro-channel;
   wherein each magnetic valve of said plurality of magnetic valves comprises a magnetic bead and a cavity on said chip next to a corresponding micro-channel section;
   wherein said magnetic bead comprises:
   a magnetic volume element;
   wherein said magnetic volume element forces said magnetic bead to move along a cavity length of said cavity in response to said proximal magnetic field gradient, and
   a bead surface cover,
   wherein said bead surface cover provides chemical resistance and reduces friction and stiction of said magnetic bead within said cavity;
   wherein said cavity length is perpendicular to said corresponding micro-channel section, and said cavity length has a closed end away from said corresponding micro-channel section and an open end at said corresponding micro-channel section;
   wherein said each magnetic valve is at an ON state, if said magnetic bead is at said closed end of said cavity length allowing fluid flow through said corresponding micro-channel section;
   wherein each of said plurality of magnetic valves is at an OFF state, if said magnetic bead is at said open end of said cavity length blocking fluid flow through said corresponding micro-channel section;
   wherein said vicinity of said chip comprises a plurality of guiding magnet position ranges;
   wherein said operator repositions guiding magnet within said plurality of guiding magnet position ranges in order to actuate said plurality of magnetic valves simultaneously;
   wherein if said guiding magnet is within an ON-ON position range of said plurality of guiding magnet position ranges, then both said first magnetic valve and said second magnetic valve are simultaneously at said ON state;
   wherein if said guiding magnet is within an ON-OFF position range of said plurality of guiding magnet position ranges, then simultaneously said first magnetic valve is at said ON state, and said second magnetic valve is at said OFF state;
   wherein if said guiding magnet is within an OFF-ON position range of said plurality of guiding magnet position ranges, then simultaneously said first magnetic valve is at said OFF state, and said second magnetic valve is at said ON state; and
   wherein if said guiding magnet is within an OFF-OFF position range of said plurality of guiding magnet position ranges, then both said first magnetic valve and said second magnetic valve are simultaneously at said OFF state.

* * * * *